(No Model.)
W. E. CANEDY.
DRILLING MACHINE.
No. 422,569. Patented Mar. 4, 1890.
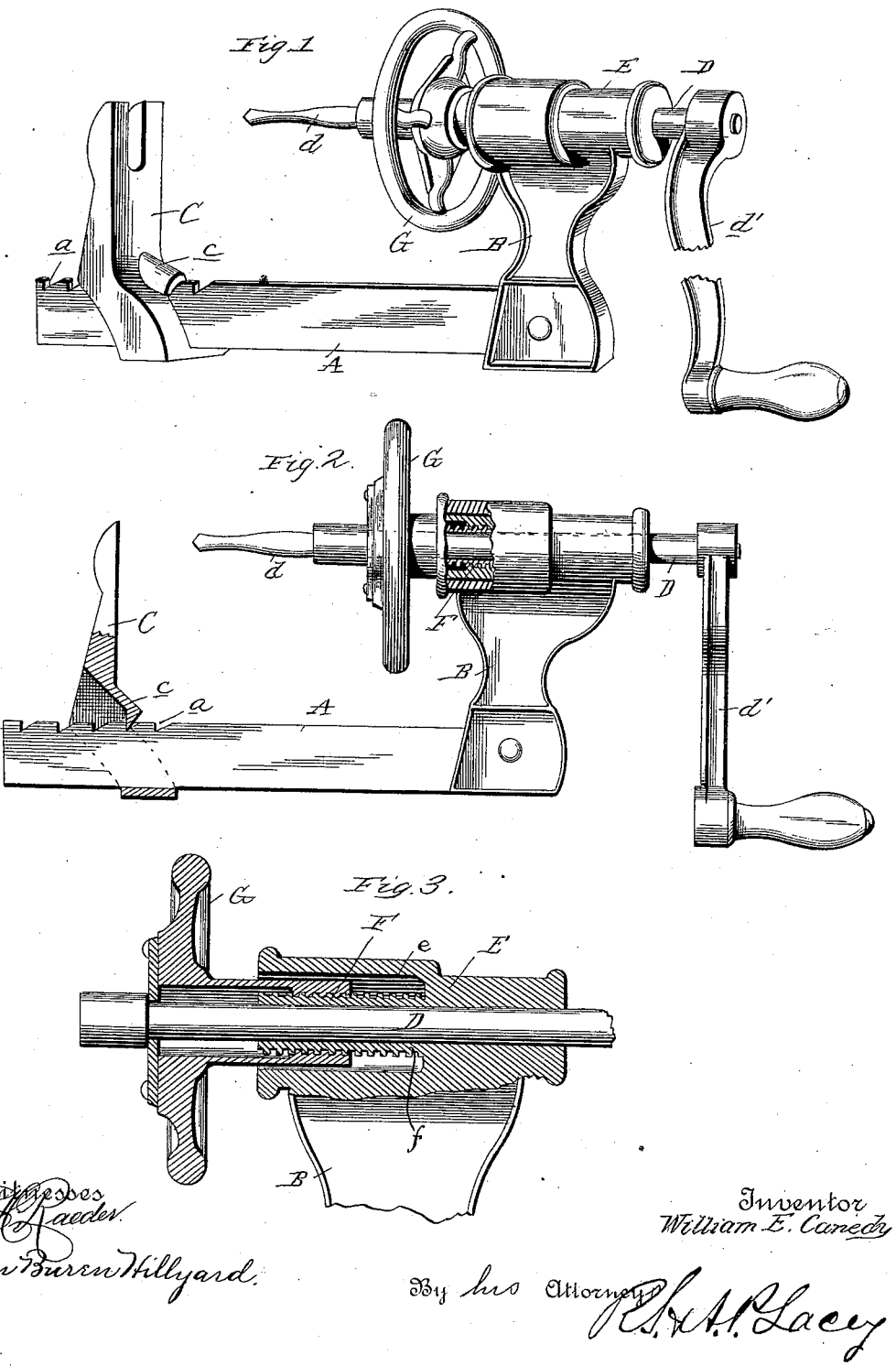

UNITED STATES PATENT OFFICE.

WILLIAM E. CANEDY, OF DOWNER'S GROVE, ILLINOIS, ASSIGNOR OF ONE-HALF TO WM. H. EDWARDS, OF SAME PLACE.

DRILLING-MACHINE.

SPECIFICATION forming part of Letters Patent No. 422,569, dated March 4, 1890.

Application filed July 2, 1889. Serial No. 316,279. (No model.)

*To all whom it may concern:*

Be it known that I, WILLIAM E. CANEDY, a citizen of the United States, residing at Downer's Grove, in the county of Du Page and State of Illinois, have invented certain new and useful Improvements in Drilling-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hand-drilling and machines of like nature which require the operating-tool to be gradually advanced to its work.

The object of the invention is to provide a long bearing for the tool-shaft and a housing for the tubular screw on which the feed-wheel is mounted.

The improvement consists of the novel features which will be hereinafter more fully described and claimed, and which are shown in the annexed drawings, in which—

Figure 1 is a perspective view of a drilling-machine embodying my invention; Fig. 2, a side view, parts being broken away, of the drill; Fig. 3, a side view, parts being broken away, of the head-stock on a larger scale.

The guide-bar A is provided at one end with the head-stock B and with the adjustable foot-rest C, which latter is held in place by the stop $c$ engaging with one of a series of notches $a$ in the upper edge of the said guide-bar. The shaft D, having the tool $d$ on its inner end and the crank $d'$ on its outer end, is journaled in the upper end of the head-stock, the bearing E being enlarged at its inner end $e$ to accommodate the tubular screw F, which is fastened at its inner end $f$ in the head-stock in any suitable manner, preferably by being cast therein. It will be observed that the tubular screw is in line with the bearing E, and is inclosed by the latter.

The feed-wheel G is mounted on the tubular screw F, and is provided with an internally-threaded tubular extension, which is adapted to screw on the screw F and extend within the surrounding bearing E.

Having thus described my invention, what I claim, and desire to secure by Letters Patent, is—

1. The herein-described head-stock having the tubular screw inclosed within the bearing of the head-stock and secured therein at one end, substantially as set forth.

2. The combination, with the head-stock, of the tubular screw F and the feed-wheel mounted on the said screw, substantially as described.

3. The combination, with the head-stock having the inner end of its bearing enlarged, of the tubular screw inclosed within the said enlarged portion of the bearing and fastened at its inner end to the said head-stock, substantially as described.

4. The combination, with the head-stock having the tubular screw inclosed within the same, of the feed-wheel having a tubular extension mounted on the said screw and arranged to extend within the said portion of the head-stock which surrounds the said screw, substantially as described.

In testimony whereof I affix my signature in presence of two witnesses.

WILLIAM E. CANEDY.

Witnesses:
S. E. VERMILYEA,
H. H. ROSE.